(12) United States Patent
Bjarnason et al.

(10) Patent No.: US 12,513,187 B2
(45) Date of Patent: Dec. 30, 2025

(54) SYSTEMS AND METHODS FOR COHORT DENIAL OF SERVICE ATTACK DETECTION AND MITIGATION

(71) Applicant: NetScout Systems, Inc., Westford, MA (US)

(72) Inventors: Steinthor Bjarnason, Fjerdingby (NO); Brian St. Pierre, Acworth, NH (US); Filippo Vitale, Orlando, FL (US)

(73) Assignee: NetScout Systems, Inc., Westford, MA (US)

( * ) Notice: Subject to any disclaimer, the term of this patent is extended or adjusted under 35 U.S.C. 154(b) by 55 days.

(21) Appl. No.: 18/671,840

(22) Filed: May 22, 2024

(65) Prior Publication Data

US 2025/0365310 A1 Nov. 27, 2025

(51) Int. Cl.
*H04L 9/40* (2022.01)
*G06F 21/62* (2013.01)

(52) U.S. Cl.
CPC ...... *H04L 63/1458* (2013.01); *G06F 21/6218* (2013.01)

(58) Field of Classification Search
CPC .............. H04L 63/1458; G06F 21/6218
See application file for complete search history.

(56) References Cited

U.S. PATENT DOCUMENTS

| | | | | |
|---|---|---|---|---|
| 7,185,368 B2* | 2/2007 | Copeland, III | ..... | H04L 63/1416 709/227 |
| 7,594,009 B2* | 9/2009 | Triulzi | ............... | H04L 63/1416 709/224 |
| 11,882,138 B2* | 1/2024 | Tackabury | .......... | H04L 63/1433 |
| 2008/0301810 A1* | 12/2008 | Lehane | ............... | H04L 63/0263 726/23 |
| 2024/0365121 A1* | 10/2024 | Northway | ........... | H04L 63/1458 |

* cited by examiner

*Primary Examiner* — Han Yang
(74) *Attorney, Agent, or Firm* — Foley & Lardner LLP

(57) ABSTRACT

A network monitoring device is connected to a communications network and monitors traffic transmitted to and from a server. The system stores a device fingerprint of devices identified as involved in attacks across the communications network, generates attack patterns for attacks across the communications network based on data packets transmitted or received by the devices during an attack based on the data packets corresponding to the device fingerprint, monitors data packet exchanges between the server and network devices, determines a set of transmission parameters for each of the data packet exchanges, compares the set of transmission parameters for the plurality of data packet exchanges to the attack patterns, and, responsive to determining a match between a first set of transmission parameters and an attack pattern, applies a tag to a network device communicating with the server via the data packet exchange indicating the network device is involved in an attack.

20 Claims, 7 Drawing Sheets

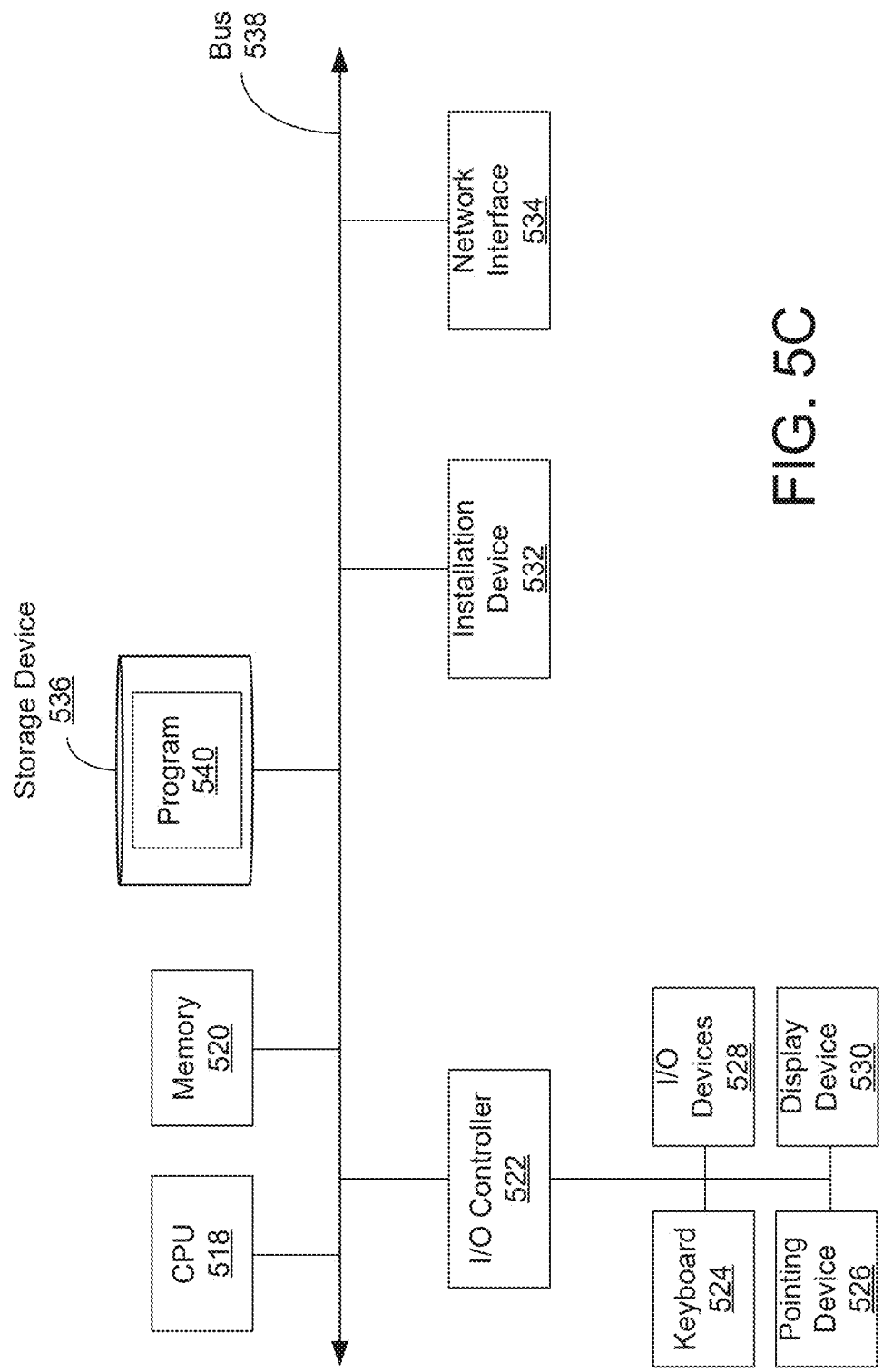

SYSTEMS AND METHODS FOR COHORT DENIAL OF SERVICE ATTACK DETECTION AND MITIGATION

BACKGROUND

Distributed denial of service (DDOS) attacks are used by malicious actors to deny access to a given network service. A class of DDOS attacks focus on an application layer. These application layer attacks may involve attacking a specific application, such as web servers, session initiation protocol (SIP) voice services, and/or Domain Name System (DNS) servers, among others. The attacks may involve dedicated DDOS attack tools comprising thousands of devices. As a result, detecting the attacks may be time consuming.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5C is a block diagram depicting an implementation of a computing device that can be used in connection with the system depicted in FIG. 1, and the methods depicted in FIGS. 2-4.

DETAILED DESCRIPTION

Figure 1:
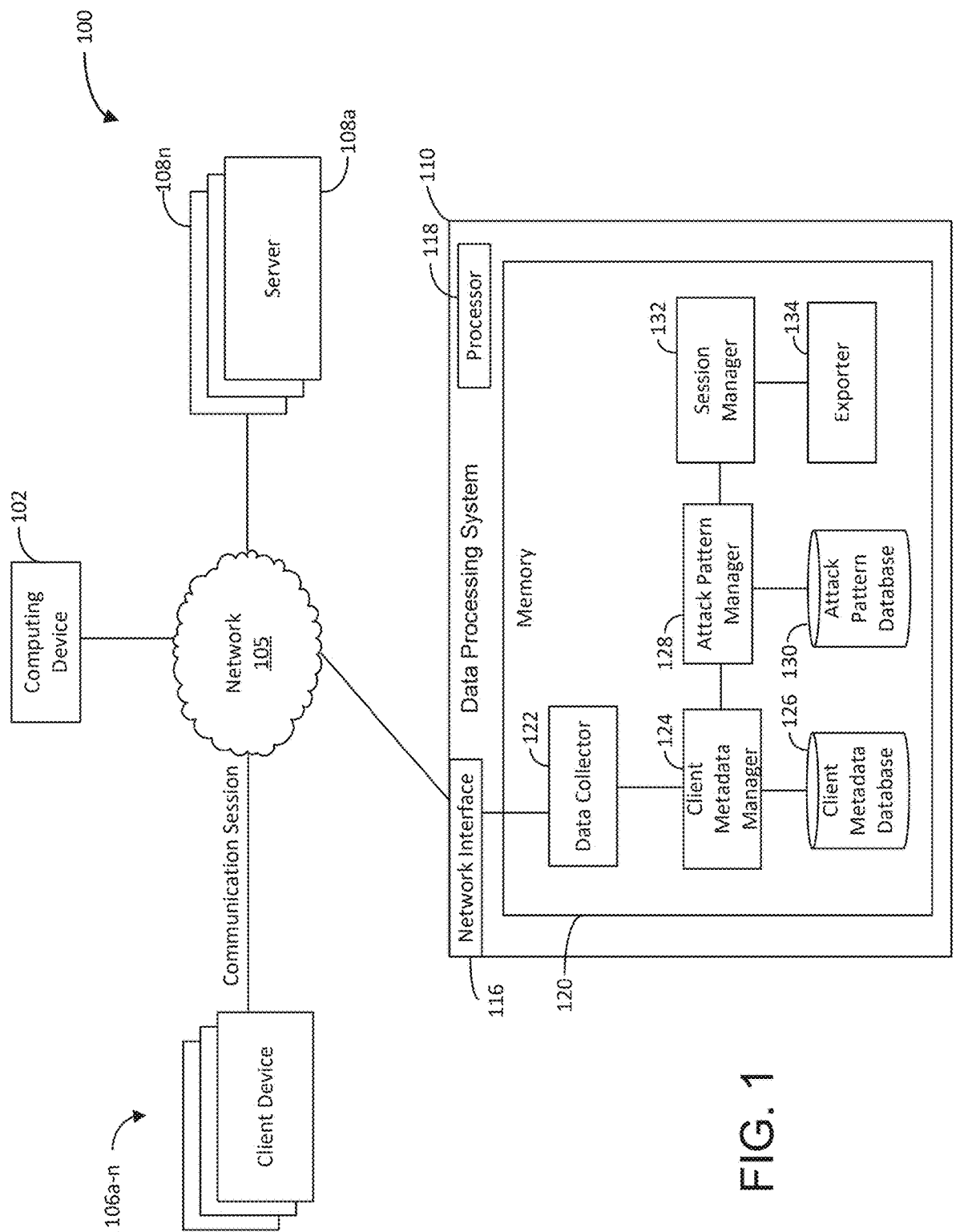
FIG. 1 is an illustration of a system for attack pattern parameters, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Distributed denial of service (DDOS) attacks are used by malicious actors to deny access to a given network service. A class of DDOS attacks focus on an application layer. These application layer attacks may involve attacking a specific application, such as web servers, session initiation protocol (SIP) voice services, and domain name system (DNS) servers, among others. The attacks may involve dedicated DDOS attack tools. For example, DDOS attacks may utilize a Botnet comprising many devices (e.g., thousands of devices). As a result, detecting the attacks may be difficult and time consuming, especially when abnormal client activity is detected over time. This can result in increased downtime.

The systems and methods described herein may utilize cohort analysis to detect DDOS attackers and mitigate attacks. Cohort analysis involves identifying one malicious client or attacker and analyzing the client and corresponding attack to identify further attackers. Specifically, upon analysis of the malicious client, a set of client characteristics and an attack pattern can be extracted and used to identify other malicious clients having the same or similar characteristics and/or attack patterns. Identifying additional malicious clients may allow the system to block attacks as early as possible. For example, in some instances, malicious clients may be blocked before the attack is initiated.

FIG. 1 is an illustration of a system 100 for cohort analysis of DDOS attacks, in accordance with an implementation. The system 100 may enable detection of DDOS attacks by identifying characteristics of one malicious client and utilizing the information to block additional similar clients. In brief overview, the system 100 can include, access, or otherwise interface with one or more of a data processing system 110 (e.g., a probe, an inspection device), that receives and/or stores data packets transmitted via a network 105 between client devices 106a-n (hereinafter client device 106 or client devices 106) and servers 108a-n. The servers 108 can each include a set of one or more servers 502, depicted in FIG. 5A, or a data center 508. The client device 106 may be an example of a user equipment (UE) or another device that can access the network 105. The client device 106 can communicate with the servers 108 to access a service (e.g., a website, an application, etc.). The client device 106, the server 108, and the data processing system 110 can communicate or interface via the network 105.

Each of the client devices 106, the servers 108, the computing device 102, and/or the data processing system 110 can include or utilize at least one processing unit or other logic device such as programmable logic array engine, or module configured to communicate with one another or other resources or databases. The components of the client devices 106, the servers 108, the computing device 102, and/or the data processing system 110 can be separate components or a single component. In some embodiments, the data processing system 110 may be an intermediary device between the client devices 106 and the servers 108. In some embodiments, the computing device 102 may be an external device (e.g., a security device, a monitoring device, etc.). In some embodiments, the computing device 102, the server 108, the data processing system 110, or any combination thereof, may share at least some components or be the same device. The system 100 and its components can include hardware elements, such as one or more processors, logic devices, or circuits.

The client devices 106, the servers 108, the computing device 102, and/or the data processing system 110 can include or execute on one or more processors or computing devices (e.g., the computing device 503 depicted in FIG. 5C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the servers 108 for data (e.g., a communication session including requests from the client devices 106 and responses from the servers 108).

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The server 108 can be hosted by a third-party cloud server via a virtual environment. The server 108 can be hosted in a public cloud, a co-location facility, or a private cloud. The server 108 can be hosted in a private data center, or on one or more physical servers, virtual machines, or containers of an entity or customer. The servers 108 may each be or include servers or computers configured to transmit or provide services across network 105 to client devices 106. The servers 108 may transmit or provide such services upon receiving requests for the services from any of the client devices 106. The term "service" as used herein includes the supplying or providing of information over a network and is also referred to as a communications network service. Examples of services include 5G broadband services, any voice, data or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The server 108 can be hosted or refer to cloud 510 depicted in FIG. 5B.

The client device 106 can establish communication sessions with the servers 108 to receive data from the servers 108. For example, a user associated with the client device 106 may request a service. Responsive to the request, a cloud provider 108 associated with the service may send requested data to the client device 106 in a communication session. The client devices 106 may establish communication sessions with the cloud providers 108 for any type of application or for any type of call.

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. A user may be, but is not necessarily, a human user; users may also be autonomous systems such as remote sensors or sensor networks, unattended displays such as transit information monitors, or surveillance cameras. The client device 106 can be deployed at a separate site, such as an availability zone managed by a public cloud provider (e.g., a cloud 510 depicted in FIG. 5B). If the client device 106 is deployed in a cloud 510, the client device 106 can include or be referred to as a virtual client device or virtual machine. In the event the client device 106 is deployed in a cloud 510, the packets exchanged between the client device 106 and the servers 108 can still be retrieved by the data processing system 110 from the network 105.

In various embodiments, the client device 106 may be a malicious device used to initiate a DDOS attack on the server 108. The client devices 106 may perform attacks on the server 108 using one or more attack patterns. An attack pattern may be a characteristic or feature of the client device 106 that is unique to how to the client device 106 performs an attack on the server 108. An attack pattern may be, for example, a pattern in one or more of an application layer field, an example DNS query name, a SIP user agent, and/or an HTTP user agent. An attack pattern may also be a client and/or server packet size, a client and server inter-packet timing analysis, and/or a behavioral type activity model. The client device 106 may be identifiable by one or more client device characteristics, stored as metadata of the device. Characteristics of the client device 106 may be, for example, an IP address location, an IP address classless inter-domain routing (CIDR), an IP address autonomous system number (ASN), and/or a transport layer security (TLS) establishment phase fingerprint. A TLS establishment phase fingerprint may be, for example, a JA3 fingerprint.

The computing device 102 may be similar to client devices 106. In various embodiments, the computing device 102 may be a network monitoring device configured to monitor network traffic transmitted to and from the server 108 (e.g., during a communication session between a client device 106 and the server 108). During a communication session between the server 108 and a client device 106 identified as being malicious, the computing device 102 may receive one or more messages from data processing system 110 indicating that the client device 106 should be blocked or otherwise prevented from communicating with the server 108. In some cases, the client devices 106 and/or the data processing system 110 can be deployed in the cloud 510 on the same computing host in an infrastructure 516 (described below with respect to FIG. 5B).

The data processing system 110 may comprise one or more processors that are configured to perform mitigation measures (e.g., blocking data packets) by transmitting a message to the computing device 102 to block incoming data packets during a communication session between the client device 106 and the servers 108. The data processing system 110 may comprise a network interface 116, a processor 118, and/or memory 120. The data processing system 110 may communicate with any of the computing device 102, the client devices 106, and/or the servers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a data collector 122, a client metadata manager 124, a client metadata database 126, an attack pattern manager 128, an attack pattern database 130, a session manager 132, and an exporter 134. The data processing system 110 may further include other components, managers, handlers, etc. to perform the techniques as described herein. In brief overview, the components 122-134 may determine whether a client device 106 communicating with the server 108 is malicious.

The components 122-134 may comprise a DDOS attack detection mechanism. The components 122-134 may determine, during a communication session across the network 105 between a client device 106 and the server 108, whether the client device 106 is malicious and committing a DDOS attack on the server. The detection mechanism may provide certain information for information flows (e.g., 5-tuples) identified as part of the attack. The data processing system 110, specifically the attack pattern manager 128, may identify that an attack is occurring or will occur across the network 105. Responsive to determining that one client device is malicious and has committed an attack, the components 122-134 may identify a set of attack patterns which the malicious client uses in its attack. Using the attack patterns combined with malicious client characteristics, the components 122-134 may identify other malicious clients based on one or both of client devices having the same/similar client characteristics and client devices using the same/similar attack patterns. Responsive to the components 122-134 identifying malicious client devices, the components 122-134 may transmit a message to the computing device 102 indicating that the client device should be blocked or otherwise have its transmission of data packeted mitigated.

For example, a client launching an encrypted HTTPs DDOS attack can be detected by analyzing the encrypted DDOS traffic. A client JA3 fingerprint may have been previously calculated or determined during the establishment phase. Thus, it can be assumed that other clients having the same JA3 fingerprint may also be potentially malicious and can then subsequently be blocked during the establishment phase before the attack is launched.

In another example, having identified a DNS query flood attack originating from a client in a particular geographical region (e.g., China), it may be possible to rate limit other clients from same geographical region (e.g., using geo-fencing), for example, especially when the majority of the normal client population is based in the United States. In another example, clients sending a UDP based flooding DDOS attack where the payload matches a recently seen DDOS attack payload pattern may be blocked.

The data collector 122 may comprise programmable instructions that, upon execution, cause the processor 118 to obtain (e.g., receive, collect) data transmitted between the client devices 106 and the servers 108 as part of a communication session. For example, the client device 106 may send a request for a service to the server 108. The server 108 may send a response to provide the service to the client device 106. The data collector 122 may collect information related to metadata of the client device 106. In some cases, the request for service may be associated with a malicious attack. Thus, the data collector 122 may also collect attack patterns or attack pattern parameters associated with attacks performed by one or more client devices 106.

The client metadata manager 124 may comprise programmable instructions that, upon execution, cause the processor 118 to extract and/or otherwise utilize client metadata. To do so, the client metadata manager 124 may communicate with the data collector 122 and the client metadata database 126. The client metadata database 126 may be a database (e.g., relational, non-relational, object oriented) that stores metadata extracted from a client device 106 in the form of a database entry. In various embodiments, when the DDOS detection mechanism (e.g., the system 100) detects an attack, it may generate a malicious client database entry. The database entry may contain, for example, the flow identification (e.g., a 5-tuple), the type of attack detected, a timestamp at which the detection occurred, and/or a recording of relevant flow data. Relevant flow data may include one or more of: attack details generated by DDOS detection, raw packet payload data, data generated by flow and/or raw packet payload data analysis, and/or metadata items associated with the client and the client flow. Metadata items may include one or more of an a CIDR/ASN associated with the IP address, a physical location (e.g., a country code) associated with the IP address, and/or a JA3 fingerprint of the TLS connection. In some embodiments, the client metadata database 126 only stores metadata of client devices 106 that have been determined to be malicious. In various embodiments, the metadata items stored in the client metadata database 126 may be stored for a certain amount of time. For example, the client metadata database 126 may store only metadata items from clients communicating with the server 108 within the last hour.

As stated above, some client devices 106 may be malicious clients performing an attack on the server 108. The malicious client devices 106 may attack the server 108 using a certain attack pattern. An attack pattern may also be referred to as payload data or as having certain attack pattern parameters. The attack pattern manager 128 may determine an attack pattern of a client device 106 and may compare the attack pattern to a previous attack pattern to determine whether the client device 106 should be blocked from communicating with the server 108. Responsive to identifying an attack pattern, the attack pattern may be stored in the attack pattern database 130. An attack pattern may be stored in the attack pattern database 130 as a table value or database entry containing attack pattern parameters. The attack pattern database 130 may be regularly updated. The attack pattern parameters may be generated using the entries from the client metadata database 126. An attack patterns may be or include, for example, patterns in application layer fields, DNS query names, SIP user agents, and/or HTTP user agents, computed elements such as DNS query name regular expressions and/or payload regular expressions, statistically identified parameters such as average client/server flow inter-packet timing and/or an average packet size, dynamically identified parameters and parameter values for generic attack detection, and/or behavior type activity models. In various embodiments, to ensure that database entries does not become stale and to manage the size of the database, attack parameter items older than a certain age (e.g., older than one hour) may be automatically removed from the attack pattern database 130.

In various embodiments, while an attack is in progress by a client device 106, information to be stored in one or both of the client metadata database 126 and the attack pattern database 130 may continue to be retrieved and stored.

The attack pattern manager 128 may periodically perform parameter identification on the malicious client database 126 using an attack pattern parameter identification algorithm. The attack pattern manager 128 may perform periodic parameter identification using one or more algorithms. The attack pattern manager 128 may utilize client characteristics, metadata, and/or a subset of payload data as parameters to the algorithm. For any identified sets of parameters, the attack pattern manager 128 may check the number of client matches between the parameters and the entries in the client metadata database 126. If the match count is greater than or equal to a threshold value (e.g., 3 matches) the attack pattern manager 128 may save the identified sets of parameters to the attack pattern database 130.

The session manager 132 may monitor communication sessions between a client device 106 and the server 108. For example, for each client device 106 establishing a communication with the server 108, the client metadata manager may extract a set of characteristics or metadata items from the client device 106. The session manager 132 may, for each metadata item, check if the extracted item matches items recorded in the client metadata database 126. The session manager 132 may determine whether a count of such matches between extracted items and items in the client metadata database 126 is greater than or equal to a threshold value (e.g., 3 matches). If so, the session manager 132 may communicate to the exporter 134 that corresponding mitigation methods should be implemented. Mitigation methods may include, for example, blocking, rate-limiting, and/or redirecting to secondary service clusters.

If a count of matches is less than the threshold value, the client device 106 may pass payload data to the server 108. While the client device 106 is communicating with the server 108, the session manager 132 may utilize the attack pattern parameter identification algorithm described above with respect to the attack pattern manager 128. The algorithm may be utilized by the session manager 132 to determine attack patterns of a client device 106 currently communicating with the server 108. For example, the session manager 132 may, for each parameter identified by the attack pattern parameter identification algorithm, calculate a flow characteristic of the client device 106 for that parameter. The session manager 132 may compare each flow's characteristics to the parameters in the attack pattern parameter identification algorithm. The session manager 132 may determine whether a flow contains characteristics matching an identified attack pattern. If a match is determined, the session manager 132 may send a message, via the exporter 134, to the computing device 102 indicating that the flow be terminated and that further traffic sent on that session be dropped.

If the flow does not match any of the parameters, the session manager 132 may continue to monitor the flow. If the flow is determined to be malicious, the client characteristics may be stored in the malicious client database 126. For example, the session manager 132 may indicate to the client metadata manager 124 that the characteristics be stored in the database. If a record for the client characteristics already exists in the malicious client database 126, a match counter for the record may be updated. The match counter may be managed by the client metadata manager 124. For example, the session manager may perform the count and may communicate the information to the client metadata manager 124. In some embodiments, the client metadata manager 124 may perform the count. If the flow is determined to be malicious, the session manager 132 may send a message to the computing device 102, via the exporter 134, to mitigate the flow.

The exporter 134 may comprise executable instructions that, upon execution by the processor 118, may send (e.g., export, provide, transmit) an instruction to the computing device 102 to block or otherwise mitigate communication from the client device 106. For example, upon a determination by the session manager 132 that a client device 106 is malicious, the session manager 132 may indicate to the exporter 134 that the client device 106 be blocked or a data flow from the client device 106 be mitigated. The exporter 134 may transmit the message to the computing device 102. The computing device 102 may execute the instruction to block or mitigate the client device 106.

Figure 2:
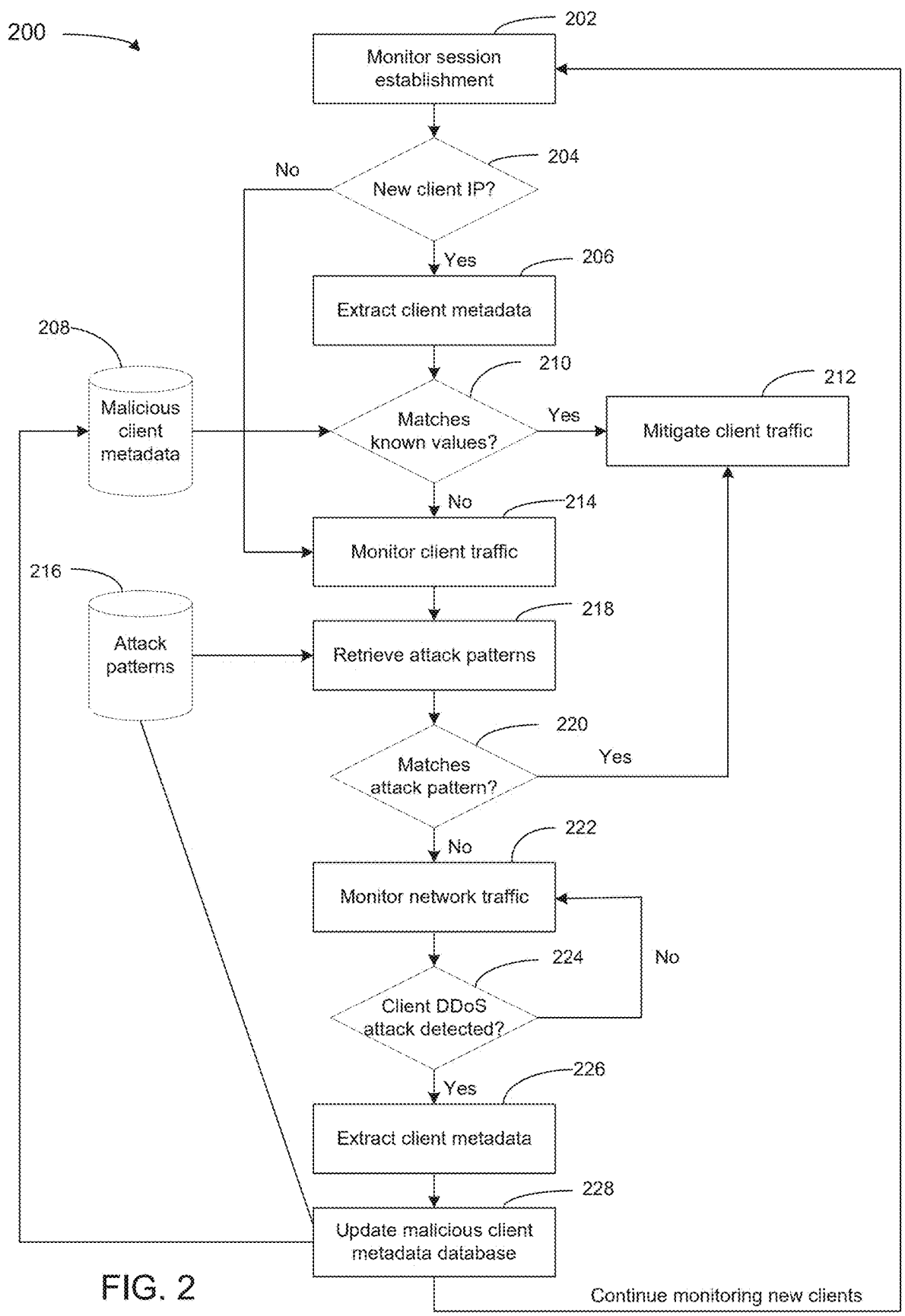
FIG. 2 is an illustration of a flow diagram of a method for cohort identification, in accordance with an implementation.

Referring now to FIG. 2, a flow diagram of a method 200 for cohort identification is shown, according to an example embodiment. The method 200 can be performed by a data processing system (a client device, a probe, the data processing system 110, shown and described with reference to FIG. 1, a server system, etc.). The method 200 may include more or fewer operations and the operations may be performed in any order.

At operation 202, the data processing system 110 monitors an establishment of a communication session. The communication session may be established between a client device 106 and the server 108 over the network 105. The communication session may be monitored by, for example, the data processing system 110 (e.g., specifically the session manager 132). The communication session may be established by, for example, the client device 106 sending a request to the server 108. Monitoring the communication session establishment may include identifying the IP address of the client device 106.

At operation 204, the data processing system 110 may determine whether the IP address of the client device 106 is new. For example, the data processing system 110 may determine whether the client device 106 has previously established a communication session with the server 108. The data processing system 110 may determine whether the client IP address is new by comparing the IP address to a database storing IP addresses of clients that have previously established communication sessions with the server 108. The database of IP addresses may be stored, for example, in the memory 120 of the data processing system 110.

Responsive to a determination at operation 204 by the data processing system 110 that the client IP address is not new (e.g., the client device 106 has previously established a communication session with the server 108), the method 200 may continue to operation 214. At operation 214, the data processing system 110 may monitor client traffic. Monitoring client traffic may include, for example, monitoring data packets transmitted from the client device 16 to the server 108. Continuing to operation 214 may indicate that the client communicating with the server 108 has not previously launched a DDOS attack on the server 108.

Responsive to a determination at operation 204 by the data processing system 110 that the client IP address is new (e.g., the client device 106 has not previously established a communication session with the server 108), the method 200 may continue to operation 206. At operation 206, the data processing system 206 may extract client metadata from the client device 106. The client metadata may include, for example, client characteristics such as an IP address location, an IP address CIDR/ASN, and/or a TLS establishment phase fingerprint.

At operation 210, the data processing system 110 may determine whether the extracted client metadata matches a known value (e.g., client metadata previously extracted from a client and stored in memory). The data processing system 110 may determine whether the extracted client metadata matches a known value by comparing the client metadata extracted at operation 206 with previously stored client metadata. The previously stored client metadata may specifically be malicious client metadata. The malicious client metadata may be stored in the malicious client metadata database 208. The malicious client metadata database 208 may be the same as or similar to the client metadata database 126. In various embodiments, multiple pieces of metadata may be extracted from the client device 106 at operation 206. For each piece of extracted metadata, the data processing system 110 may determine if the piece of metadata matches a piece of metadata stored in the malicious client metadata database 208. The extracted metadata and the stored metadata may include, for example, a CIDR/ASN associated with the IP address of the client device 106, a physical location (e.g., a country code or postal code) associated with the IP address of the client device 106, and/or a JA3 fingerprint of the TLS connection. To determine if the method 200 should continue to operation 212 or operation 214, the data processing system 110 may count the number of matches between pieces of extracted metadata and pieces of stored metadata. If the match count is greater than or equal to a predefined threshold value, the match count may indicate that the client device 106 is likely to be malicious, and the method 200 may continue to operation 212. Responsive to the match count being less than a predefined threshold value, the match count may indicate that the client device 106 is not likely to be malicious, and the method 200 may continue to operation 214.

Responsive to a determination at operation 210 that the extracted metadata matches a known or previously stored value and/or that the number of matches is greater than or equal to a predefined threshold value, the method 200 may continue to operation 212. At operation 212, the data processing system 110 may mitigate client traffic coming from the client device 106. Specifically, the session manager 132 may indicate to the exporter 134 that client traffic should be mitigated. The exporter 134 may transmit a message to the computing device 102 to mitigate the traffic. The computing device 102 may perform the mitigation measure(s). Client traffic may be mitigated by, for example, blocking the client device 106 from being able to send data packets to the server 108, rate-limiting the data packets sent from the client device 106, redirecting the client device 106 to a secondary service cluster, etc. The match between the client metadata and the stores metadata may indicate that the client device 106 is a client that has previously performed a DDOS attack on the server 108 using a different IP address. This may indicate that the client device 106 may again perform an attack on the server 108. Thus, to prevent this, the data processing system 110 may mitigate client traffic from the client device 106.

Responsive to a determination at operation 210 that the extracted metadata does not match a known or previously stored value, and/or that the number of matches is less than a predefined threshold value, the method 200 may continue to operation 214. At operation 214, the data processing system 110 may monitor client traffic. Monitoring client traffic may include, for example, monitoring data packets transmitted from the client device 16 to the server 108. Continuing to operation 214 may indicate that the client communicating with the server 108 has not previously launched a DDOS attack on the server 108.

While the client traffic is being monitored, the client device 106 may continue to transmit network traffic to the server 108. The client device 106 may perform an attack on the server 108. At operation 218, the data processing system 110 may extract one or more attack pattern parameters from previously stored attack patterns. The data processing system 110 may store previously used attack patterns in an attack pattern database 216. The attack pattern database 216 may be the same as or similar to the attack patterns database 130. Responsive to detecting a parameter or an attack pattern, the data processing system 110 may calculate a flow characteristic for the identified parameter.

At operation 220, the data processing system 110 may check whether the traffic pattern of the client device 106 matches a previously stored attack pattern parameter from previously stored attack patterns. The parameters and attack patterns may be identified using, for example, an attack pattern algorithm. An example attack pattern algorithm will be described in greater detail with respect to FIG. 3. In various embodiments, the data processing system 110 may compare each characteristic of the data flow to a previously identified and stored attack pattern.

Responsive to a determination that the identified characteristic matches a stored attack pattern, the method 200 may return to operation 212, where client traffic is mitigated. Specifically, the session manager 132 may indicate to the exporter 134 that client traffic should be mitigated. The exporter 134 may transmit a message to the computing device 102 to mitigate the traffic. The computing device 102 may perform the mitigation measure(s). For example, a flow with characteristics matching an identified attack pattern may be terminated. Further traffic sent during the communication session may be dropped. Responsive to a determination that the identified characteristic does not match a stored attack pattern, the method 200 continues to operation 222. At operation 222, the data processing system 110 may further monitor network traffic.

At operation 224, the data processing system 110 may check if a client DDOS attack is detected. Specifically, the data processing system 110 may check for an attack that has not before been seen by the system and therefore has not been stored in the attack pattern database 216.

Responsive to a determination that an attack has not been detected, the method 200 may return to operation 222, where the data processing system 110 continues to monitor network traffic. Responsive to a determination that an attack has been detected, the method 200 may continue to operation 226.

At operation 226, the data processing system 110 may extract client metadata from the client device 106. Client metadata may include, for example, attack details generated by DDoS detection, raw packet payload data, data generated by flow and/or raw packet payload data analysis, and/or metadata items associated with the client and client flow.

At operation 228, the data processing system 110 may update the malicious client metadata database 208 with the client metadata extracted at operation 226. The method 200 may then return to operation 202 where the data processing system 110 may monitor a session establishment between the server 108 and a new client device 106.

An example situation in which the method 200 may be implemented for successive malicious clients will be described below.

The attack pattern parameter identification algorithm may first not have data to process. A botnet client (e.g., client device 106) may attempt to connect to the server 108. At operation 206, the client's characteristics may be extracted. However, there may be no entries in the malicious client database. Thus, the client is allowed to establish a flow. During communication, the client may begin to send malicious data. At operation 218, no attack parameters may exist, so no processing of the attack patterns may be performed. At operation 224, the client's malicious activity may be detected. At operation 228, the client characteristics, including relevant metadata and the attack patterns, may stored in the malicious client metadata database 208 and/or the attack patterns database 216. At operation 226, the client flow may be mitigated (e.g., by blocking, rate-limiting, and/or redirecting communication to secondary service clusters).

Prior to a second client, the attack pattern parameter identification algorithm may attempt to identify attack parameters and may identify a set of attack parameters. However, the number of matching client entries may be less than the threshold value. Thus, no attack parameters may be stored.

A second botnet client from the same botnet may attempt to connect to the server 108. The characteristics from the client device 106 may be extracted. A match may be found in the malicious client database 208, but the number of matched entries may be below the threshold value. Thus, the client may be allowed to establish a flow. The client may begin to send malicious data. At operation 218, no attack parameters may exist, so no processing is may be performed. At operation 224, the client's malicious activity may be detected. The client characteristics/metadata may match an existing entry in the malicious client characteristics database 208. Thus, the match counter may be increased by 1. The client flow may be mitigated.

Prior to a third client, the attack pattern parameter identification algorithm may attempt to identify attack parameters and may successfully identify set of attack parameters. The number of matching client entries may still be below the threshold value. Thus, no attack parameters are stored in the attack patterns database 216. The progression through the method 200 may be the same as described above with the second botnet client.

Prior to a fourth client, the attack pattern parameter identification algorithm may attempt to identify attack parameters and may successfully identify set of attack parameters. The number of matching client entries may now be greater than or equal to the threshold value. Thus, the attack parameters are stored in the attack pattern database 216.

A fourth botnet client from the same botnet may attempt to connect to the server 108. At operation 206, the client characteristics may be extracted. At operation 210, a match may be found in the malicious client database 208. As the number of matching entries may now be greater than or equal to the threshold value, the client may be blocked from establishing a flow (e.g., operation 212). The method 200 may then terminate as the client has been blocked from establishing a flow with the server 108.

Continuing the above example, a new botnet client N may be a new botnet but utilizes the same DDOS attack as the first through fourth clients from the botnet above.

The botnet client from a new botnet may attempt to connect to the server 108. At operation 206, the client characteristics may be extracted. No match may be found the malicious client database, so the client may be permitted to establish the flow. The client may then begin to send malicious data. At operation 218, each parameter identified by the attack pattern parameter identification algorithm may be evaluated. Thus, a flow characteristic for that parameter may be calculated. Each flow's characteristics may be compared to the parameters in the attack parameter database 216 identified by the attack pattern parameter identification algorithm. In this case, the malicious flow may match an identified attack pattern. Further traffic sent on that session may be dropped. The method 200 may then terminate.

Continuing the above example, a new botnet client N+1 may attempt to establish a session with the server 108. For example, a second botnet client from the same botnet as client N above may attempt to connect to the server 108.

At operation 206, the client characteristics may be extracted. At operation 210, a match may be found in the malicious client database 208. However, the number of matched entries may be less than the threshold value. Thus, the client may be allowed to establish a flow (e.g., continue to operation 214). The client may then begin to send malicious data. At operation 218, each parameter identified by the attack pattern parameter identification algorithm may evaluated. Thus, a flow characteristic for that parameter may be calculated. Each flow's characteristics may be compared to the parameters in the attack parameter database 216 identified by the attack pattern parameter identification algorithm. In this case, the malicious flow may match an identified attack pattern. Thus, further traffic sent on that session will be dropped. The method 200 may then terminate.

Continuing the above example, a new botnet client N+2 may attempt to establish a session with the server 108. For example, a second botnet client from the same botnet as clients N and N+1 above may attempt to connect to the server 108. The method 200 may continue following the same operations as described above for client N+1.

Continuing the above example, a new botnet client N+3 may attempt to establish a session with the server 108. For example, a second botnet client from the same botnet as clients N, N+1, and N+2 above may attempt to connect to the server 108. A botnet client N+3 from the new botnet may attempt to connect to the server 108.

At operation 206, the client characteristics may be extracted. At operation 210, a match may be found in the malicious client database for the new botnet. The number of matching entries may be greater than or equal to the threshold value. Thus, at operation 212, the client may be blocked from establishing a flow. The method 200 may then terminate.

Figure 3:
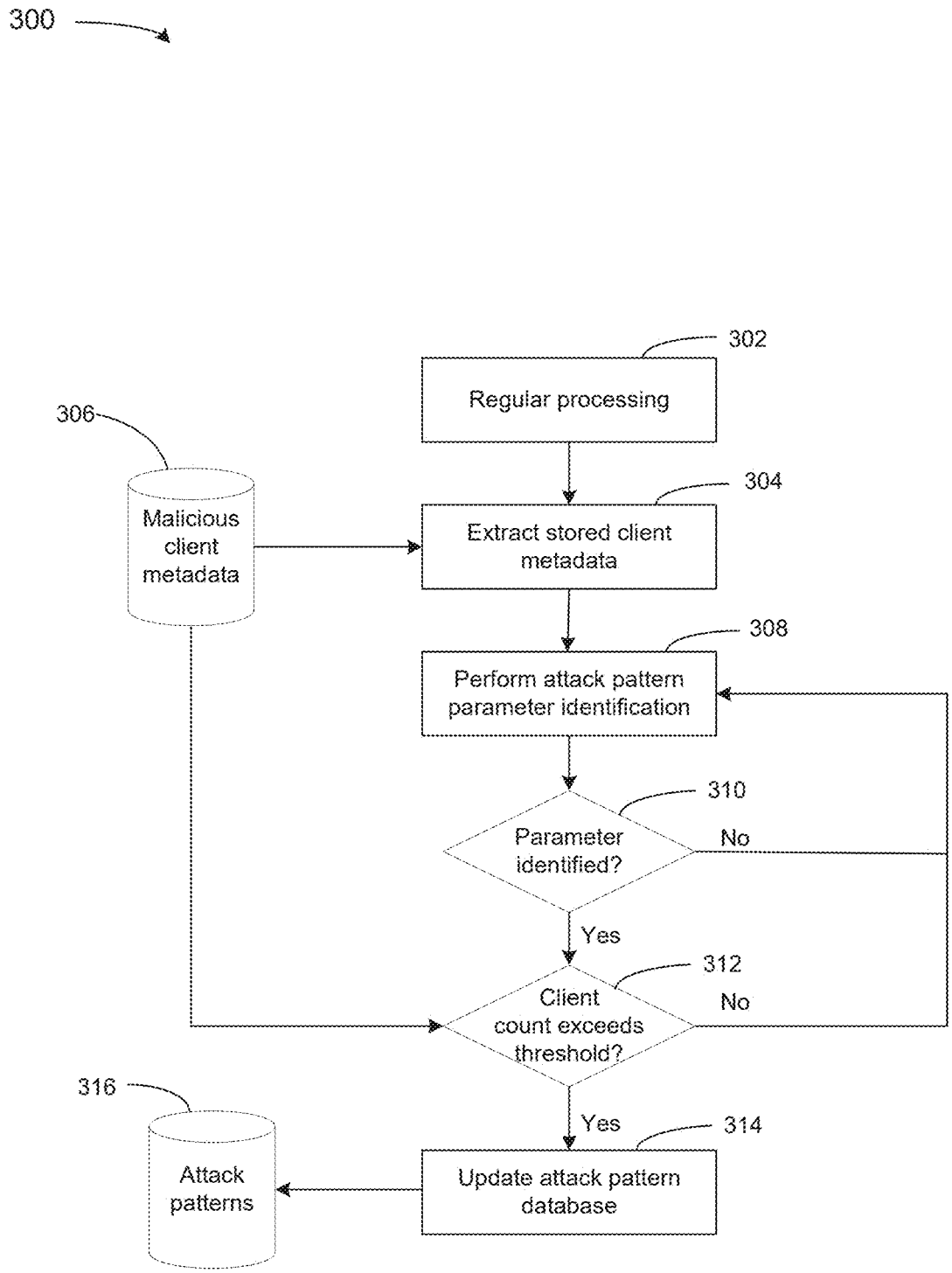
FIG. 3 is an illustration of a flow diagram of a method for attack pattern parameter identification, in accordance with an implementation.

Referring now to FIG. 3, a flow diagram of a method 300 for attack pattern parameter identification is shown, according to an example embodiment. The method 300 may be for generating the attack patterns stored in an attack pattern database (e.g., one or more of the attack pattern databases 130, 216, or 316). The method 300 may be performed periodically (e.g., at a regular or irregular interval). The method 300 can be performed by a data processing system (a client device, a probe, the data processing system 110, shown and described with reference to FIG. 1, a server system, etc.). The method 300 may include more or fewer operations and the operations may be performed in any order.

At operation 302, processing of the method 300 is started. Processing of the method 300 may occur at periodic intervals. For example, the operations of the method 300 may occur and repeat after a predetermined period of time.

At operation 304, the data processing system 110 may extract stored client metadata, for example, from the malicious client metadata database 306. The malicious client metadata database may be the same as or similar to the malicious client metadata database 208 or the malicious client metadata database 126.

At operation 308, the data processing system 110 may perform an attack pattern parameter identification. This may include performing parameter identification on the malicious client metadata database 306 via algorithms, using, for example, client characteristics, metadata, and/or a subset of payload data as potential parameters. Parameter identification may include determining whether there is a match between an attack pattern parameter in the attack pattern database 316 and the extracted client metadata.

At operation 310, the data processing system 110 may determine whether a parameter has been identified. Responsive to a determination that a parameter has not been identified, the method 300 may return to operation 308. Responsive to a determination that a parameter has been identified, the method 300 may continue to operation 312.

At operation 312, the data processing system 110 may determine a number of matches between the identified parameters and clients. For example, the data processing system 110 may determine a number of clients in the malicious client metadata database 306 having the identified parameter. The data processing system 110 may determine if the number of clients having the identified parameter is greater than or equal to a predetermined threshold value. Responsive to the number of matches being less than the predetermined threshold value, the method 300 may return to operation 308. Responsive to the number of matches being greater than or equal to the predetermined threshold value, the method 300 may continue to operation 314.

At operation 314, the data processing system 110 may update the attack pattern database 316 with the identified parameter. The identified parameter may then be used in the method 200 to be compared to an attack pattern of a client device 106 communicating with the server 108. In various embodiments, attack patterns or attack parameters may be periodically removed from the attack pattern database 316. For example, to prevent metadata from becoming stale and/or to manage a size of the database, attack patterns or parameters older than a certain age may be removed from the database 316. For example, if an attack pattern has been stored in the database 316 for longer than one hour, the attack pattern or parameter may be removed.

Figure 4:
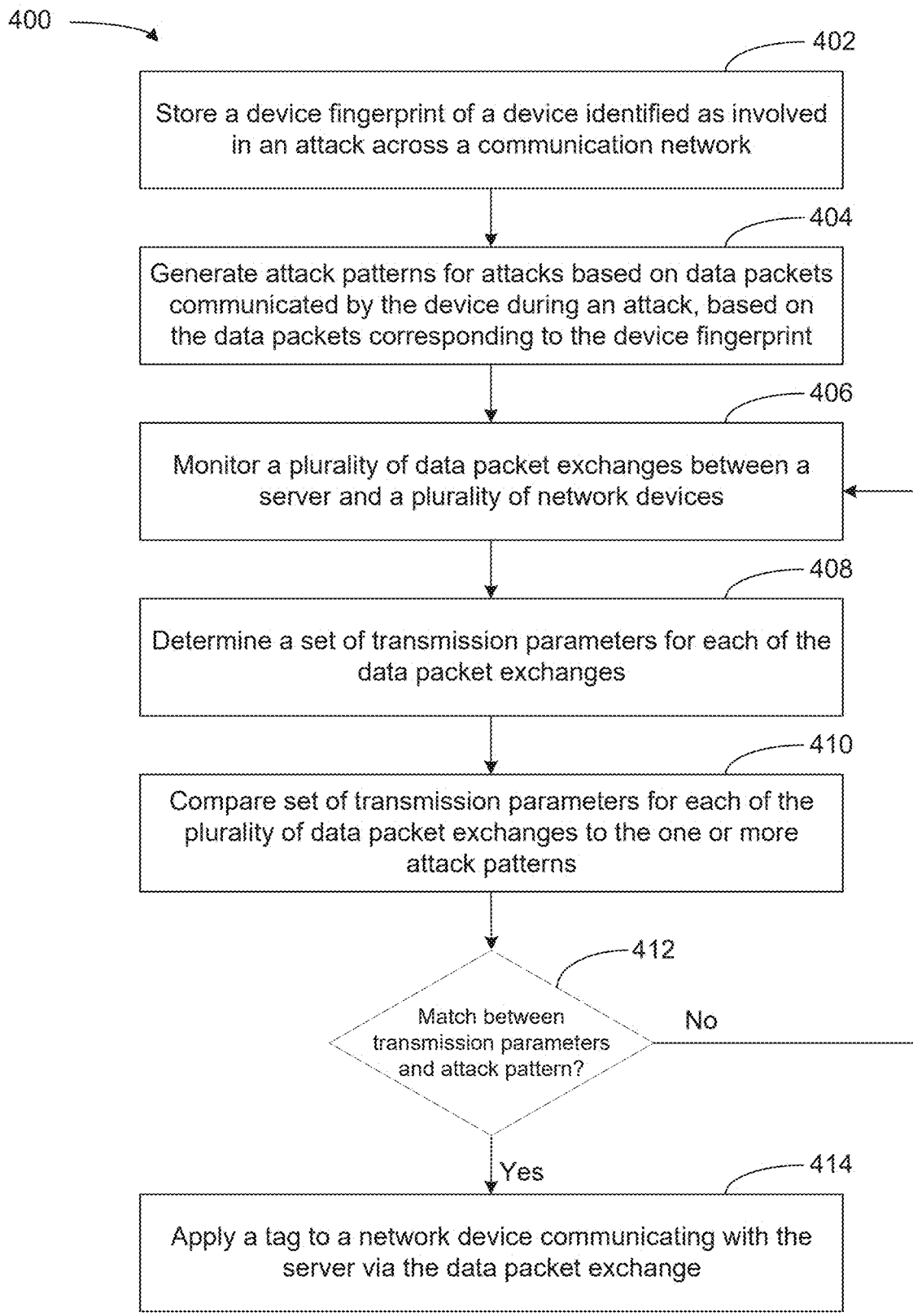
FIG. 4 is an illustration of a flow diagram of a method for mitigation of DDOS attacks using cohort identification, in accordance with an implementation.

Referring now to FIG. 4, a flow diagram of a method 400 for mitigation of DDOS attacks using cohort identification is shown, according to an example embodiment. A network monitoring device may be connected to a communications network (e.g., network 105). The network monitoring device may be configured to monitor network traffic transmitted to and from a server (e.g., the server 108) across the communications network. The device fingerprint may be stored, for example, in the malicious client metadata database 126. The method 400 can be performed by a data processing system (a client device, a probe, the data processing system 110, shown and described with reference to FIG. 1, a server system, etc.). The method 400 may include more or fewer operations and the operations may be performed in any order. In various embodiments, steps 402 and 404 may occur before, during, and/or after a communication session has been established between a server and a client device.

At operation 402, the data processing system 110 may store a device fingerprint of a device. The device may be a client device 106 communicating with the server 108 in a communication session. The device may be identified as being involved in an attack across the communications network. The device fingerprint may be, for example, an ASN associated with the IP address, a physical location (e.g., a "geoip") associated with the IP address, and/or a TLS establishment phase fingerprint, such as a JA3 fingerprint. At operation 402, data packets and/or data flows associated with the device may also be stored, along with the device fingerprint.

In various embodiments, the device fingerprint may be or include one or more of an IP address location, an IP address classless inter-domain routing (CIDR), an IP address autonomous system number (ASN), or a transport layer security (TLS) establishment phase fingerprint.

In various embodiments, at operation 402, the data processing system 110 may store one or more identifications of the one or more devices in a database. Each identity of the one or more identifications may correspond to a device of the one or more devices. At operation 402, the data processing system 110 may add an identification of a first device to the database (e.g., client metadata database 126) based on a message from the first device matching the device fingerprint.

In various embodiments, each of the one or more identifications of the one or more devices stored in the database may include a data flow identification, an attack pattern, a timestamp at which the device was detected, and a record of flow data.

At operation 404, the data processing system 110 may generate one or more attack patterns for attacks across the communications network. The generated attack patterns may be based on data packets transmitted or received by the device (e.g., client device 106) during attack across the communications network. The data processing system 110 may also generate attack patterns based on the data packets that are stored at operation 402 and/or correspond to the device fingerprint stored at operation 402. The generated attack patterns may be stored in the attack pattern database 130.

In various embodiments, the attack pattern may be a pattern in one or more of an application layer field, an example domain name system (DNS) query name, a session initiation protocol (SIP) user agent, a hypertext transfer protocol (HTTP) user agent, or a client and server packet size.

At operation 404, the data processing system 110 may identify a set of attack parameters corresponding to one or more identifications stored in the database (e.g., the identifications stored in the client metadata database 126). The data processing system 110 may also determine, responsive to identifying the set of attack parameters, a number of identifications matching the set of attack parameters. Responsive to the number of identifications matching the set of attack parameters being at or above a predefined threshold, the data processing system 110 may save the set of attack parameters to a database storing attack patterns.

At operation 406, the data processing system 110 may monitor a plurality of data packet exchanges. The exchanges may be between the server (e.g., the server 108) and one or more network devices (e.g., one or more client devices 106). The exchange of data packets may indicate a communication session between the server and the network device.

At some point during the occurrence of the method 400, the data processing system 110 may retrieve an IP address of at least one network device of the plurality of network devices. The data processing system 110 may compare the IP address of the at least one network device to a plurality of IP addresses stored in a database. The database may store IP addresses of devices (e.g., client device 106) that have established a communication session with the server. Responsive to a determination that the IP address of the at least one network device matches at least one of the plurality of IP addresses stored in the database, the data processing system 110 may monitor the plurality of data packet exchanges between the server and the at least one network device of the plurality of network devices. For example, the data processing system 110 may perform operation 406 and subsequently continue to operation 408.

In various embodiments, responsive to a determination by the data processing system 110 that the IP address of the at least one network device does not match at least one of the plurality of IP addresses stored in the database, the data processing system 110 may retrieve a device fingerprint of at the least one network device of the plurality of network devices. The data processing system 110 may compare the device fingerprint of the at least one network device to a stored device fingerprint (e.g., a fingerprint stored at operation 402) of at least one of the one or more devices identified as involved in attacks across the communications network.

In various embodiments, responsive to determination that the device fingerprint of the at least one network device matches the stored device fingerprint of at least one of the one or more devices, the data processing system 110 may block the at least one network device from exchanging a plurality of data packets with the server, and the method 400 may cease. In various embodiments, responsive to a determination that the device fingerprint of the at least one network device does not match the stored device fingerprint of at least one of the one or more devices, the data processing system may monitor the plurality of data packet exchanges between the server and the at least one network device of the plurality of network devices. For example, the data processing system 110 may perform operation 406, and the method may continue to operation 408.

At operation 408, the data processing system 110 may determine a set of transmission parameters for each of the plurality of data packet exchanges monitored at operation 406. Transmission parameters may include, for example, attack pattern details or parameters, raw packet payload data, data generated by flow and/or raw packet payload data analysis, and/or client metadata items such as a CIDR/ASN associated with the IP address, a physical location (e.g., a "geoip") associated with the IP address, and/or a JA3 fingerprint of the TLS connection.

At operation 410, the data processing system 110 may compare a set of transmission parameters for each of the plurality of data packet exchanges determined at operation 408 to the one or more attack patterns generated at operation 404.

At operation 412, the data processing system 10 may check whether a match exists between a first set of transmission parameters for a first data packet exchange of the plurality of data packet exchanges and an attack pattern of the one or more attack patterns. For example, a first client device 106 may transmit data packets to the server 108. The data processing system 110 may check for a match between the data packets and an attack pattern stored in the attack pattern database 130.

The data processing system 110 may determine the match between the first set of transmission parameters and the attack pattern, for example by determining an inter-packet timing of the first data packet exchange matches an inter-packet timing of the attack pattern. The data processing system 110 may also determine the match between the first set of transmission parameters and the attack pattern by determining that a frequency of transmission of the first data packet exchange matches a frequency of the attack pattern.

Responsive to a determination that a match does not exist between the first set of transmission parameters and an attack pattern, the method 400 may return to monitoring data packet exchanges at operation 406. Responsive to a determination that a match exists between the first set of transmission parameters and an attack pattern, the method 400 may continue to operation 414. At operation 414, the data processing system 110 may apply a tag to the network device that is communicating with the server via the data packet exchange. The tag may indicate that the network device is involved in a second attack (e.g., a different attack than the attack identified at operation 404) across the communications network.

The data processing system 110 or the computing device 102 may block the data packets transmitted to or from the tagged network device to mitigate an attack on the server 108.

At operation 412, the data processing system 110 may determine that a second set of transmission parameters for a second data packet exchange of the plurality of data packet exchanges does not match any of the one or more attack patterns. Responsive to the determination, the data processing system 110 may continue monitoring the second data packet exchange to generate a third set of transmission parameters for the third data packet exchange. Responsive to determining, at operation 412, a match between the third set of transmission parameters for the second data packet exchange of the plurality of data packet exchanges and the attack pattern of the one or more attack patterns, the data processing system 110 may apply a second tag to a second network device communicating with the server via the second data packet exchange. The second tag may indicate that the second network device is involved in the second attack across the communications network.

Figure 5A:
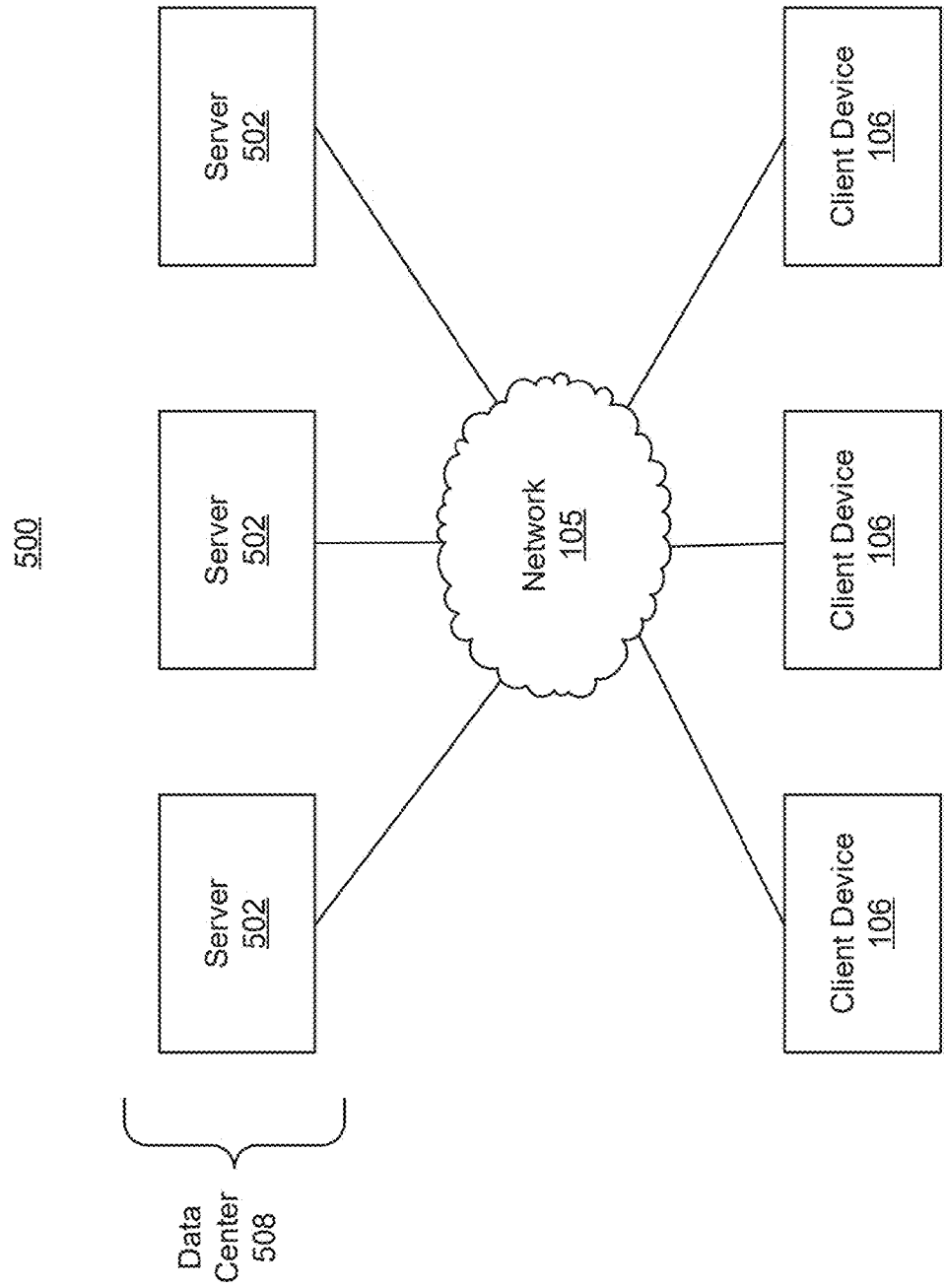
FIG. 5A is a block diagram depicting an implementation of a network environment including a client device in communication with a server device.

FIG. 5A depicts an example network environment that can be used in connection with the methods and systems described herein. In brief overview, the network environment 500 includes one or more client devices 106 (also generally referred to as clients, client node, client machines, client computers, client computing devices, endpoints, or endpoint nodes) in communication with one or more servers 502 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 5A shows a network 105 between the client devices 106 and the servers 502, the client devices 106 and the servers 502 can be on the same network 105. In embodiments, there are multiple networks 105 between the client devices 106 and the servers 502. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 500 can include multiple, logically grouped servers 502. The logical group of servers can be referred to as a data center 508 (or server farm or machine farm). In embodiments, the servers 502 can be geographically dispersed. The data center 508 can be administered as a single entity or different entities. The data center 508 can include multiple data centers 508 that can be geographically dispersed. The servers 502 within each data center 508 can be homogeneous or heterogeneous (e.g., one or more of the servers 502 or machines 502 can operate according to one type of operating system platform (e.g., WINDOWS NT, manufactured by Microsoft Corp. of Redmond, Washington), while one or more of the other servers 502 can operate on according to another type of operating system platform (e.g., Unix, Linux, or Mac OS X)). The servers 502 of each data center 508 do not need to be physically proximate to another server 502 in the same machine farm 508. Thus, the group of servers 502 logically grouped as a data center 508 can be interconnected using a network. Management of the data center 508 can be de-centralized. For example, one or more servers 502 can comprise components, subsystems and modules to support one or more management services for the data center 508.

Server 502 can be a file server, application server, web server, proxy server, appliance, network appliance, gateway, gateway server, virtualization server, deployment server, SSL VPN server, or firewall. In embodiments, the server 502 can be referred to as a remote machine or a node. Multiple nodes can be in the path between any two communicating servers.

Figure 5B:
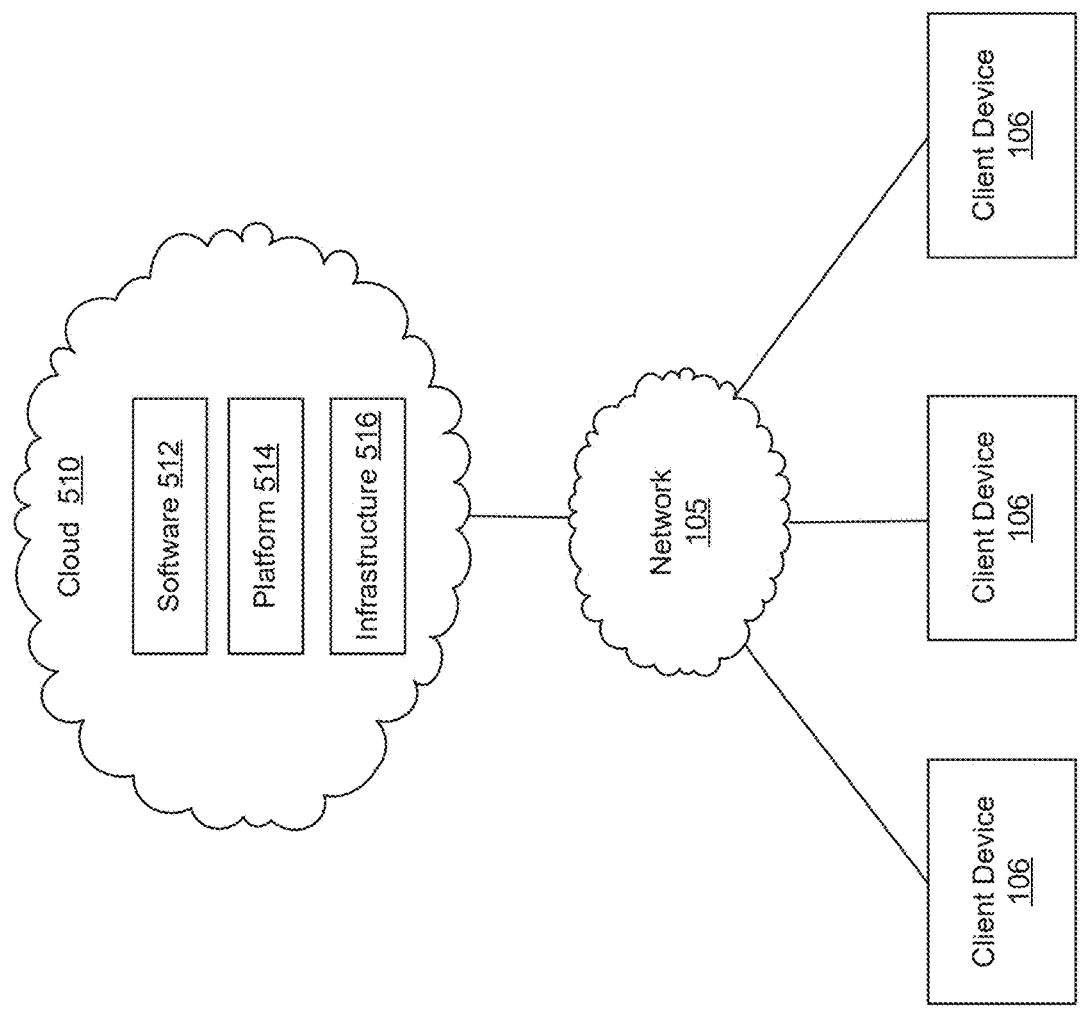
FIG. 5B is a block diagram depicting a cloud computing environment including a client device in communication with cloud servers.

FIG. 5B illustrates an example cloud computing environment. A cloud computing environment 501 can provide client 106 with one or more resources provided by a network environment. The cloud computing environment 501 can include one or more client devices 106, in communication with the cloud 510 over one or more networks 105. Client devices 106 can include, e.g., thick clients, thin clients, and zero clients. A thick client can provide at least some functionality even when disconnected from the cloud 510 or servers 502. A thin client or a zero client can depend on the connection to the cloud 510 or server 502 to provide functionality. A zero client can depend on the cloud 510 or other networks 105 or servers 502 to retrieve operating system data for the client device. The cloud 510 can include back-end platforms, e.g., servers 502, storage, server farms or data centers.

The cloud 510 can be public, private, or hybrid. Public clouds can include public servers 502 that are maintained by third parties to the client devices 106 or the owners of the clients. The servers 502 can be located off-site in remote geographical locations as disclosed above or otherwise. Public clouds can be connected to the servers 502 over a public network. Private clouds can include private servers 502 that are physically maintained by client devices 106 or owners of clients. Private clouds can be connected to the servers 502 over a private network 105. Hybrid clouds 508 can include both the private and public networks 105 and servers 502.

The cloud 510 can also include a cloud-based delivery, e.g., Software as a Service (Saas) 512, Platform as a Service (PaaS) 514, and the Infrastructure as a Service (IaaS) 516. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 502 can be deployed as and/or executed on any type and form of computing device, e.g., a computer, network device or appliance capable of communicating on any type and form of network and performing the operations described herein.

FIG. 5C depicts block diagrams of a computing device 503 useful for practicing an embodiment of the client 106 or a server 502. As shown in FIG. 5C, each computing device 503 can include a central processing unit 518, and a main memory unit 520. As shown in FIG. 5C, a computing device 503 can include one or more of a storage device 536, an installation device 532, a network interface 534, an I/O controller 522, a display device 530, a keyboard 524 or a pointing device 526, e.g., a mouse. The storage device 536 can include, without limitation, a program 540, such as an operating system, software, or software associated with system 100.

The central processing unit 518 is any logic circuitry that responds to and processes instructions fetched from the main memory unit 520. The central processing unit 518 can be provided by a microprocessor unit, e.g.: those manufactured by Intel Corporation of Mountain View, California. The computing device 503 can be based on any of these processors, or any other processor capable of operating as described herein. The central processing unit 518 can utilize instruction level parallelism, thread level parallelism, different levels of cache, and multi-core processors. A multi-core processor can include two or more processing units on a single computing component.

Main memory unit 520 can include one or more memory chips capable of storing data and allowing any storage location to be directly accessed by the microprocessor 518. Main memory unit 520 can be volatile and faster than storage 536 memory. Main memory units 520 can be Dynamic random-access memory (DRAM) or any variants, including static random access memory (SRAM). The memory 520 or the storage 536 can be non-volatile; e.g., non-volatile read access memory (NVRAM). The memory 520 can be based on any type of memory chip, or any other available memory chips. In the example depicted in FIG. 5C, the processor 518 can communicate with memory 520 via a system bus 538.

A wide variety of I/O devices 528 can be present in the computing device 503. Input devices 528 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 528 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 528, display devices 530 or group of devices can be augmented reality devices. The I/O devices can be controlled by an I/O controller 522 as shown in FIG. 5C. The I/O controller 522 can control one or more I/O devices, such as, e.g., a keyboard 524 and a pointing device 526, e.g., a mouse or optical pen. Furthermore, an I/O device can also provide storage and/or an installation device 532 for the computing device 503. In embodiments, the computing device 503 can provide USB connections (not shown) to receive handheld USB storage devices. In embodiments, an I/O device 528 can be a bridge between the system bus 538 and an external communication bus, e.g., a USB bus, a SCSI bus, a FireWire bus, an Ethernet bus, a Gigabit Ethernet bus, a Fibre Channel bus, or a Thunderbolt bus.

In embodiments, display devices 530 can be connected to I/O controller 522. Display devices can include, e.g., liquid crystal displays (LCD), electronic papers (e-ink) displays, flexile displays, light emitting diode displays (LED), or other types of displays. In some embodiments, display devices 530 or the corresponding I/O controllers 522 can be controlled through or have hardware support for OPENGL or DIRECTX API or other graphics libraries. Any of the I/O devices 528 and/or the I/O controller 522 can include any type and/or form of suitable hardware, software, or combination of hardware and software to support, enable or provide for the connection and use of one or more display devices 530 by the computing device 503. For example, the computing device 503 can include any type and/or form of video adapter, video card, driver, and/or library to interface, communicate, connect or otherwise use the display devices 530. In embodiments, a video adapter can include multiple connectors to interface to multiple display devices 530.

The computing device 503 can include a storage device 536 (e.g., one or more hard disk drives or redundant arrays of independent disks) for storing an operating system or other related software, and for storing application software programs 540 such as any program related to the systems, methods, components, modules, elements, or functions depicted in FIG. 1, or 2. Examples of storage device 536 include, e.g., hard disk drive (HDD); optical drive including CD drive, DVD drive, or BLU-RAY drive; solid-state drive (SSD); USB flash drive; or any other device suitable for storing data. Storage devices 536 can include multiple volatile and non-volatile memories, including, e.g., solid state hybrid drives that combine hard disks with solid state cache. Storage devices 536 can be non-volatile, mutable, or read-only. Storage devices 536 can be internal and connect to the computing device 503 via a bus 538. Storage device 536 can be external and connect to the computing device 503 via an I/O device 530 that provides an external bus. Storage device 536 can connect to the computing device 503 via the network interface 534 over a network 105. Some client devices 106 may not require a non-volatile storage device 536 and can be thin clients or zero client devices 106. Some storage devices 536 can be used as an installation device 532 and can be suitable for installing software and programs.

The computing device 503 can include a network interface 534 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 503 can communicate with other computing devices 502 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 534 can include a built-in network adapter, network interface card, PCMCIA network card, EXPRESSCARD network card, card bus network adapter, wireless network adapter, USB network adapter, modem or any other device suitable for interfacing the computing device 503 to any type of network capable of communication and performing the operations described herein.

A computing device 503 of the sort depicted in FIG. 5C can operate under the control of an operating system, which controls scheduling of tasks and access to system resources. The computing device 503 can be running any operating system configured for any type of computing device, including, for example, a desktop operating system, a mobile device operating system, a tablet operating system, or a smartphone operating system.

The computing device 503 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 503 has sufficient processor power and memory capacity to perform the operations described herein. In some embodiments, the computing device 503 can have different processors, operating systems, and input devices consistent with the device.

In embodiments, the status of one or more machines 106, 503 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 503 in response to the CPU 518 executing an arrangement of instructions contained in main memory 520. Such instructions can be read into main memory 520 from another computer-readable medium, such as the storage device 536. Execution of the arrangement of instructions contained in main memory 520 causes the computing device 503 to perform the illustrative processes described herein. One or more processors in a multi-processing arrangement may also be employed to execute the instructions contained in main memory 520. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

One embodiment relates to a system. The system may include a network monitoring device connected to a communications network. The network monitoring device may be configured to monitor network traffic transmitted to and from a server across the communications network. The network monitoring device may include one or more processors coupled with memory. The memory may store executable instructions that, when executed by the one or more processors, cause the one or more processors to: store a device fingerprint of one or more devices identified as involved in attacks across the communications network, generate one or more attack patterns for attacks across the communications network based on data packets transmitted or received by the one or more devices during an attack across the communications network based on the data packets corresponding to the device fingerprint, monitor a plurality of data packet exchanges between the server and a plurality of network devices, determine a set of transmission parameters for each of the plurality of data packet exchanges, compare the set of transmission parameters for each of the plurality of data packet exchanges to the one or more attack patterns and, responsive to determining a match between a first set of transmission parameters for a first data packet exchange of the plurality of data packet exchanges and an attack pattern of the one or more attack patterns, apply a tag to a network device communicating with the server via the data packet exchange, the tag indicating the network device is involved in a second attack across the communications network.

In various embodiments, the instructions further cause the one or more processors to store one or more identifications of the one or more devices in a database, each identity of the one or more identifications corresponding to a device of the one or more devices and add an identification of a first device to the database based on a message from the first device matching the device fingerprint. In various embodiments, each of the one or more identifications of the one or more devices stored in the database includes a data flow identification, an attack pattern, a timestamp at which the device was detected, and a record of flow data. In various embodiments, the attack pattern is a pattern in one or more of an application layer field, an example domain name system (DNS) query name, a session initiation protocol (SIP) user agent, a hypertext transfer protocol (HTTP) user agent, or a client and server packet size. In various embodiments, the instructions cause the one or more processors to determine the match between the first set of transmission parameters and the attack pattern by determining an inter-packet timing of the first data packet exchange matches an inter-packet timing of the attack pattern.

In various embodiments, the instructions cause the one or more processors to determine the match between the first set of transmission parameters and the attack pattern by determining a frequency of transmission of the first data packet exchange matches a frequency of the attack pattern. In various embodiments, the device fingerprint comprises one or more of an IP address location, an IP address classless inter-domain routing (CIDR), an IP address autonomous system number (ASN), or a transport layer security (TLS) establishment phase fingerprint. In various embodiments, the instructions further cause the one or more processors to block the data packets transmitted to or from the tagged network device. In various embodiments, the instructions cause the one or more processors to: determine a second set of transmission parameters for a second data packet exchange of the plurality of data packet exchanges does not match any of the one or more attack patterns, and, responsive to the determination, continue monitoring the second data packet exchange to generate a third set of transmission parameters for the third data packet exchange, and responsive to determining a match between the third set of transmission parameters for the second data packet exchange of the plurality of data packet exchanges and the attack pattern of the one or more attack patterns, apply a second tag to a second network device communicating with the server via the second data packet exchange, the second tag indicating the second network device is involved in the second attack across the communications network. In various embodiments, the instructions further cause the one or more processors to identify a set of attack parameters corresponding to one or more identifications stored in the database, determine, responsive to identifying the set of attack parameters, a number of identifications matching the set of attack parameters, and, responsive to the number of identifications matching the set of attack parameters being at or above a predefined threshold, save the set of attack parameters to a database storing attack patterns.

At least one aspect relates to a method. The method includes storing, on a network monitoring device, a device fingerprint of one or more devices identified as involved in attacks across a communications network, generating, by one or more processors of the network monitoring device, one or more attack patterns for attacks across the communications network based on data packets transmitted or received by the one or more devices during an attack across the communications network based on the data packets corresponding to the device fingerprint, monitoring, by the one or more processors, a plurality of data packet exchanges between a server and a plurality of network devices, determining, by the one or more processors, a set of transmission parameters for each of the plurality of data packet exchanges, comparing, by the one or more processors, the set of transmission parameters for each of the plurality of data packet exchanges to the one or more attack patterns, and applying, by the one or more processors, responsive to determining a match between a first set of transmission parameters for a first data packet exchange of the plurality of data packet exchanges and an attack pattern of the one or more attack patterns, a tag to a network device communicating with the server via the data packet exchange, the tag indicating the network device is involved in a second attack across the communications network.

In various embodiments, the method further includes storing, by the one or more processors on the network device, one or more identifications of the one or more devices in a database, each identity of the one or more identifications corresponding to a device of the one or more devices, and adding, by the one or more processors, an identification of a first device to the database based on a message from the first device matching the device fingerprint. In various embodiments, each of the one or more identifications of the one or more devices stored in the database includes a data flow identification, an attack pattern, a timestamp at which the device was detected, and a record of flow data. In various embodiments, the attack pattern is a pattern in one or more of an application layer field, an example domain name system (DNS) query name, a session initiation protocol (SIP) user agent, a hypertext transfer protocol (HTTP) user agent, or a client and server packet size. In various embodiments, the method further includes determining, by the one or more processors, the match between the first set of transmission parameters and the attack pattern by determining an inter-packet timing of the first data packet exchange matches an inter-packet timing of the attack pattern. In various embodiments, the method further includes determining, by the one or more processors, the match between the first set of transmission parameters and the attack pattern by determining a frequency of transmission of the first data packet exchange matches a frequency of the attack pattern.

In various embodiments, the device fingerprint is one or more of an IP address classless inter-domain routing (CIDR), an IP address autonomous system number (ASN), or a transport layer security (TLS) establishment phase fingerprint. In various embodiments, the method further includes determining, by the one or more processors, a second set of transmission parameters for a second data packet exchange of the plurality of data packet exchanges does not match any of the one or more attack patterns, continuing monitoring, responsive to the determination, the second data packet exchange to generate a third set of transmission parameters for the third data packet exchange, and applying, via the one or more processors, responsive to determining a match between the third set of transmission parameters for the second data packet exchange of the plurality of data packet exchanges and the attack pattern of the one or more attack patterns, a second tag to a second network device communicating with the server via the second data packet exchange, the second tag indicating the second network device is involved in the second attack across the communications network.

At least one aspect relates to a non-transitory computer readable medium storing instructions thereon. When executed by one or more processors, the instructions may cause the one or more processors to store, on a network monitoring device, a device fingerprint of one or more devices identified as involved in an attack across a communications network, generate, via one or more processors of the network monitoring device, one or more attack patterns for attacks across the communications network based on data packets transmitted or received by the one or more devices during attacks across the communications network based on the data packets corresponding to the device fingerprint, monitor, via the one or more processors, a plurality of data packet exchanges between a server and a plurality of network devices, determine, via the one or more processors, a set of transmission parameters for each of the plurality of data packet exchanges, compare, via the one or more processors, the set of transmission parameters for each of the plurality of data packet exchanges to the one or more attack patterns, and apply, via the one or more processors, responsive to determining a match between a first set of transmission parameters for a first data packet exchange of the plurality of data packet exchanges and an attack pattern of the one or more attack patterns, a tag to a network device communicating with the server via the data packet exchange, the tag indicating the network device is involved in a second attack across the communications network.

In various embodiments, the instructions cause the one or more processors to determine a second set of transmission parameters for a second data packet exchange of the plurality of data packet exchanges does not match any of the one or more attack patterns, responsive to the determination, continue monitoring the second data packet exchange to generate a third set of transmission parameters for the third data packet exchange, and, responsive to determining a match between the third set of transmission parameters for the second data packet exchange of the plurality of data packet exchanges and the attack pattern of the one or more attack patterns, apply a second tag to a second network device communicating with the server via the second data packet exchange, the second tag indicating the second network device is involved in the second attack across the communications network.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system comprising:
a network monitoring device connected to a communications network, the network monitoring device configured to monitor network traffic transmitted to and from a server across the communications network, the network monitoring device comprising one or more processors coupled with memory, the memory storing executable instructions that, when executed by the one or more processors, cause the one or more processors to:
store a device fingerprint of one or more devices identified as involved in attacks across the communications network;
generate one or more attack patterns for attacks across the communications network based on data packets transmitted or received by the one or more devices during an attack across the communications network based on the data packets corresponding to the device fingerprint;

monitor a plurality of data packet exchanges between the server and a plurality of network devices;

determine a set of transmission parameters for each of the plurality of data packet exchanges;

compare the set of transmission parameters for each of the plurality of data packet exchanges to the one or more attack patterns; and responsive to determining a match between a first set of transmission parameters for a first data packet exchange of the plurality of data packet exchanges and an attack pattern of the one or more attack patterns, apply a tag to a network device communicating with the server via the data packet exchange, the tag indicating the network device is involved in a second attack across the communications network.

2. The system of claim 1, wherein the instructions further cause the one or more processors to:

store one or more identifications of the one or more devices in a database, each identity of the one or more identifications corresponding to a device of the one or more devices; and add an identification of a first device to the database based on a message from the first device matching the device fingerprint, wherein each of the one or more identifications of the one or more devices stored in the database comprises a data flow identification, an attack pattern, a timestamp at which the device was detected, and a record of flow data.

3. The system of claim 2, wherein the instructions further cause the one or more processors to:

retrieve an IP address of at least one network device of the plurality of network devices;

compare the IP address of the at least one network device to a plurality of IP addresses stored in a database; and responsive to a determination that the IP address of the at least one network device matches at least one of the plurality of IP addresses stored in the database, monitor the plurality of data packet exchanges between the server and the at least one network device of the plurality of network devices.

4. The system of claim 2, wherein the instructions further cause the one or more processors to:

retrieve an IP address of at least one network device of the plurality of network devices;

compare the IP address of the at least one network device to a plurality of IP addresses stored in a database; and responsive to a determination that the IP address of the at least one network device does not match at least one of the plurality of IP addresses stored in the database, retrieve a device fingerprint of at the least one network device of the plurality of network devices; and compare the device fingerprint of the at least one network device to a stored device fingerprint of at least one of the one or more devices identified as involved in attacks across the communications network.

5. The system of claim 4, wherein the instructions further cause the one or more processors to:

responsive to a determination that the device fingerprint of the at least one network device matches the stored device fingerprint of at least one of the one or more devices, block at least one network device from exchanging a plurality of data packets with the server; and responsive to a determination that the device fingerprint of the at least one network device does not match the stored device fingerprint of at least one of the one or more devices, monitor the plurality of data packet exchanges between the server and the at least one network device of the plurality of network devices.

6. The system of claim 1, wherein the attack pattern is a pattern in one or more of an application layer field, an example domain name system (DNS) query name, a session initiation protocol (SIP) user agent, a hypertext transfer protocol (HTTP) user agent, or a client and server packet size; and wherein the device fingerprint comprises one or more of an IP address location, an IP address classless inter-domain routing (CIDR), an IP address autonomous system number (ASN), or a transport layer security (TLS) establishment phase fingerprint.

7. The system of claim 1, wherein the instructions cause the one or more processors to determine the match between the first set of transmission parameters and the attack pattern by determining an inter-packet timing of the first data packet exchange matches an inter-packet timing of the attack pattern or by determining a frequency of transmission of the first data packet exchange matches a frequency of the attack pattern.

8. The system of claim 1, wherein the instructions further cause the one or more processors to block the data packets transmitted to or from the tagged network device.

9. The system of claim 1, wherein the instructions cause the one or more processors to:

determine a second set of transmission parameters for a second data packet exchange of the plurality of data packet exchanges does not match any of the one or more attack patterns;

responsive to the determination, continue monitoring the second data packet exchange to generate a third set of transmission parameters for the third data packet exchange; and responsive to determining a match between the third set of transmission parameters for the second data packet exchange of the plurality of data packet exchanges and the attack pattern of the one or more attack patterns, apply a second tag to a second network device communicating with the server via the second data packet exchange, the second tag indicating the second network device is involved in the second attack across the communications network.

10. The system of claim 1, wherein the instructions further cause the one or more processors to:

identify a set of attack parameters corresponding to one or more identifications stored in the database;

determine, responsive to identifying the set of attack parameters, a number of identifications matching the set of attack parameters; and responsive to the number of identifications matching the set of attack parameters being at or above a predefined threshold, save the set of attack parameters to a database storing attack patterns.

11. A method comprising:

storing, on a network monitoring device, a device fingerprint of one or more devices identified as involved in attacks across a communications network;

generating, by one or more processors of the network monitoring device, one or more attack patterns for attacks across the communications network based on data packets transmitted or received by the one or more devices during an attack across the communications network based on the data packets corresponding to the device fingerprint;

monitoring, by the one or more processors, a plurality of data packet exchanges between a server and a plurality of network devices;

determining, by the one or more processors, a set of transmission parameters for each of the plurality of data packet exchanges;

comparing, by the one or more processors, the set of transmission parameters for each of the plurality of data packet exchanges to the one or more attack patterns; and applying, by the one or more processors, responsive to determining a match between a first set of transmission parameters for a first data packet exchange of the plurality of data packet exchanges and an attack pattern of the one or more attack patterns, a tag to a network device communicating with the server via the data packet exchange, the tag indicating the network device is involved in a second attack across the communications network.

12. The method of claim 11, wherein the method further comprises:

storing, by the one or more processors on the network device, one or more identifications of the one or more devices in a database, each identity of the one or more identifications corresponding to a device of the one or more devices; and adding, by the one or more processors, an identification of a first device to the database based on a message from the first device matching the device fingerprint, wherein each of the one or more identifications of the one or more devices stored in the database comprises a data flow identification, an attack pattern, a timestamp at which the device was detected, and a record of flow data.

13. The method of claim 12, wherein the method further comprises:

retrieving an IP address of at least one network device of the plurality of network devices;

comparing the IP address of the at least one network device to a plurality of IP addresses stored in a database;

responsive to a determination that the IP address of the at least one network device matches at least one of the plurality of IP addresses stored in the database, monitoring the plurality of data packet exchanges between the server and the at least one network device of the plurality of network devices.

14. The method of claim 12, wherein the method further comprises:

retrieving an IP address of at least one network device of the plurality of network devices;

comparing the IP address of the at least one network device to a plurality of IP addresses stored in a database;

responsive to a determination that the IP address of the at least one network device does not match at least one of the plurality of IP addresses stored in the database, retrieve a device fingerprint of the at least one network device of the plurality of network devices;

comparing the device fingerprint of the at least one network device to a stored device fingerprint of at least one of the one or more devices identified as involved in attacks across the communications network;

responsive to determination that the device fingerprint of the at least one network device matches the stored device fingerprint of at least one of the one or more devices, blocking at least one network device from exchanging a plurality of data packets with the server; and responsive to a determination that the device fingerprint of the at least one network device does not match the stored device fingerprint of at least one of the one or more devices, monitoring the plurality of data packet exchanges between the server and the at least one network device of the plurality of network devices.

15. The method of claim 11, wherein the attack pattern is a pattern in one or more of an application layer field, an example domain name system (DNS) query name, a session initiation protocol (SIP) user agent, a hypertext transfer protocol (HTTP) user agent, or a client and server packet size.

16. The method of claim 11, wherein the method further comprises determining, by the one or more processors, the match between the first set of transmission parameters and the attack pattern by determining an inter-packet timing of the first data packet exchange matches an inter-packet timing of the attack pattern or by determining a frequency of transmission of the first data packet exchange matches a frequency of the attack pattern.

17. The method of claim 11, wherein the device fingerprint is one or more of an IP address classless inter-domain routing (CIDR), an IP address autonomous system number (ASN), or a transport layer security (TLS) establishment phase fingerprint.

18. The method of claim 11, wherein the method further comprises:

determining, by the one or more processors, a second set of transmission parameters for a second data packet exchange of the plurality of data packet exchanges does not match any of the one or more attack patterns;

continuing monitoring, responsive to the determination, the second data packet exchange to generate a third set of transmission parameters for the third data packet exchange; and applying, via the one or more processors, responsive to determining a match between the third set of transmission parameters for the second data packet exchange of the plurality of data packet exchanges and the attack pattern of the one or more attack patterns, a second tag to a second network device communicating with the server via the second data packet exchange, the second tag indicating the second network device is involved in the second attack across the communications network.

19. A non-transitory computer readable medium storing instructions thereon that, when executed by one or more processors, cause the one or more processors to:

store, on a network monitoring device, a device fingerprint of one or more devices identified as involved in an attack across a communications network;

generate, via one or more processors of the network monitoring device, one or more attack patterns for attacks across the communications network based on data packets transmitted or received by the one or more devices during attacks across the communications network based on the data packets corresponding to the device fingerprint;

monitor, via the one or more processors, a plurality of data packet exchanges between a server and a plurality of network devices;

determine, via the one or more processors, a set of transmission parameters for each of the plurality of data packet exchanges;

compare, via the one or more processors, the set of transmission parameters for each of the plurality of data packet exchanges to the one or more attack patterns; and apply, via the one or more processors, responsive to determining a match between a first set of transmission parameters for a first data packet exchange of the plurality of data packet exchanges and an attack pattern of the one or more attack patterns, a tag to a network device communicating with the server via the data packet exchange, the tag indicating the network device is involved in a second attack across the communications network.

20. The non-transitory computer readable medium of claim 19, wherein the instructions cause the one or more processors to:

determine a second set of transmission parameters for a second data packet exchange of the plurality of data packet exchanges does not match any of the one or more attack patterns;

responsive to the determination, continue monitoring the second data packet exchange to generate a third set of transmission parameters for the third data packet exchange; and responsive to determining a match between the third set of transmission parameters for the second data packet exchange of the plurality of data packet exchanges and the attack pattern of the one or more attack patterns, apply a second tag to a second network device communicating with the server via the second data packet exchange, the second tag indicating the second network device is involved in the second attack across the communications network.

* * * * *